(12) United States Patent
Ho

(10) Patent No.: US 10,120,537 B2
(45) Date of Patent: Nov. 6, 2018

(54) PAGE-INDEPENDENT MULTI-FIELD VALIDATION IN DOCUMENT CAPTURE

(71) Applicant: EMC Corporation, Hopkinton, MA (US)

(72) Inventor: Ming Fung Ho, Fremont, CA (US)

(73) Assignee: EMC Corporation, Hopkinton, MA (US)

( * ) Notice: Subject to any disclaimer, the term of this patent is extended or adjusted under 35 U.S.C. 154(b) by 239 days.

(21) Appl. No.: 15/055,154

(22) Filed: Feb. 26, 2016

(65) Prior Publication Data

US 2016/0179313 A1 Jun. 23, 2016

Related U.S. Application Data

(63) Continuation of application No. 13/720,679, filed on Dec. 19, 2012, now Pat. No. 9,317,484.

(51) Int. Cl.
| | |
|---|---|
| *G06F 17/00* | (2006.01) |
| *G06F 3/0483* | (2013.01) |
| *G06F 17/27* | (2006.01) |
| *G06K 9/62* | (2006.01) |
| *G06K 9/00* | (2006.01) |
| *G06K 9/03* | (2006.01) |

(52) U.S. Cl.
CPC ........ *G06F 3/0483* (2013.01); *G06F 17/2725* (2013.01); *G06K 9/00449* (2013.01); *G06K 9/033* (2013.01); *G06K 9/6263* (2013.01)

(58) Field of Classification Search
CPC .................................................. G06F 17/2725
See application file for complete search history.

(56) References Cited

U.S. PATENT DOCUMENTS

| | | | | | |
|---|---|---|---|---|---|
| 5,001,769 | A * | 3/1991 | Reid-Green | .......... | G06F 17/243 358/450 |
| 5,349,648 | A * | 9/1994 | Handley | ............... | G06F 17/211 715/205 |
| 5,367,619 | A * | 11/1994 | Dipaolo | ................ | G06F 3/0489 715/221 |
| 6,158,044 | A * | 12/2000 | Tibbetts | ................ | G06F 9/4443 707/999.001 |
| 6,192,381 | B1 * | 2/2001 | Stiegemeier | .......... | G06F 17/211 715/210 |
| 6,816,630 | B1 * | 11/2004 | Werth | ................... | G06F 17/246 382/287 |
| 6,912,308 | B2 * | 6/2005 | Reintjes | ................ | G06F 3/0488 382/181 |
| 7,036,072 | B1 * | 4/2006 | Sulistio | ............... | G06F 17/2247 715/205 |
| 7,289,685 | B1 * | 10/2007 | Wolff | ................. | G06K 9/00449 283/70 |

(Continued)

*Primary Examiner* — Laurie A Ries
(74) *Attorney, Agent, or Firm* — Van Pelt, Yi & James LLP

(57) ABSTRACT

Techniques to validate data in document capture are disclosed. An indication is received that a validation rule associated with two or more dependent fields in a data entry form comprising data values extracted from a multi-page document has failed. A human validation interface is provided that enables an operator to view the affected dependent fields and for each an associated document image portion from which a corresponding data value was extracted, including by providing automated navigation to and display of the affected dependent fields.

21 Claims, 13 Drawing Sheets

(56) References Cited

U.S. PATENT DOCUMENTS

| | | | | |
|---|---|---|---|---|
| 7,376,891 B2* | 5/2008 | Hitchock | G06F 17/243 | 715/221 |
| 7,492,946 B2* | 2/2009 | Elder | G06F 17/242 | 382/187 |
| 7,644,350 B2* | 1/2010 | Piersol | G06F 17/243 | 715/221 |
| 7,698,159 B2* | 4/2010 | Metzger | G06Q 10/10 | 705/2 |
| 8,082,144 B1* | 12/2011 | Brown | G06F 17/243 | 379/201.1 |
| 8,352,861 B2* | 1/2013 | Kitayama | G06Q 10/10 | 715/221 |
| 8,355,926 B1* | 1/2013 | Hinz | G06Q 10/10 | 705/2 |
| 8,502,864 B1* | 8/2013 | Watkins | G03B 35/00 | 348/52 |
| 8,538,162 B2* | 9/2013 | Tuganbaev | H04N 1/00795 | 358/1.18 |
| 8,656,273 B1* | 2/2014 | Tifford | G06Q 30/02 | 705/3 |
| 8,792,141 B2* | 7/2014 | Moore | G06K 9/00449 | 358/1.1 |
| 2002/0062342 A1* | 5/2002 | Sidles | G06F 17/243 | 709/203 |
| 2003/0210428 A1* | 11/2003 | Bevlin | G06K 9/2063 | 358/1.18 |
| 2003/0233259 A1* | 12/2003 | Mistretta | G06Q 10/10 | 705/4 |
| 2005/0108624 A1* | 5/2005 | Carrier | G06F 17/272 | 715/221 |
| 2005/0193370 A1* | 9/2005 | Goring | G06F 9/4443 | 717/115 |
| 2008/0126161 A1* | 5/2008 | Willis | G06Q 10/06 | 719/320 |
| 2008/0285792 A1* | 11/2008 | Comay | G06F 17/243 | 382/100 |
| 2010/0070394 A1* | 3/2010 | Wyle | G06F 17/243 | 705/31 |
| 2010/0145751 A1* | 6/2010 | Berry | G06Q 10/00 | 705/35 |
| 2010/0146047 A1* | 6/2010 | Grieder | G06Q 10/087 | 709/204 |
| 2010/0223541 A1* | 9/2010 | Clee | G06F 17/21 | 715/205 |
| 2010/0246999 A1* | 9/2010 | Tillberg | G06K 9/00442 | 382/309 |
| 2011/0182500 A1* | 7/2011 | Esposito | G06K 9/00442 | 382/159 |
| 2011/0225485 A1* | 9/2011 | Schnitt | G06F 17/243 | 715/222 |
| 2012/0150935 A1* | 6/2012 | Frick | G06Q 10/10 | 709/201 |
| 2012/0314954 A1* | 12/2012 | Moore | G06K 9/00449 | 382/182 |
| 2013/0031503 A1* | 1/2013 | Madhavan | G06F 17/2211 | 715/776 |
| 2013/0254308 A1* | 9/2013 | Rose | H04N 21/252 | 709/206 |
| 2013/0283148 A1* | 10/2013 | Lim | G06F 17/30896 | 715/234 |
| 2014/0164915 A1* | 6/2014 | Liu | G06F 17/211 | 715/249 |

* cited by examiner

PAGE-INDEPENDENT MULTI-FIELD VALIDATION IN DOCUMENT CAPTURE

CROSS REFERENCE TO OTHER APPLICATIONS

This application is a continuation of co-pending U.S. patent application Ser. No. 13/720,679 entitled PAGE-INDEPENDENT MULTI-FIELD VALIDATION IN DOCUMENT CAPTURE filed Dec. 19, 2012 which is incorporated herein by reference for all purposes.

BACKGROUND OF THE INVENTION

In document capture, typically pages are recognized and validated one at a time, in sequence. In the typical approach, each page is processed independently with its own data entry form, value extraction, and validation. Values may be extracted from various places on a page and across pages in the case of a multi-page document. There can be rules that determine the correctness of multiple values in the document. If the validation rule fails, then one or more of the dependent fields may be in error. The error may be incorrect optical character recognition (OCR), incorrect location of the value, incorrectly written data on the image itself, etc. It is generally not possible to determine which field is in error, and what should be the corrective action, except by human inspection. In current approaches, a human operator may have to navigate manually, opening and closing different pages and associated forms, copying over data, etc., to compare or otherwise validate data from different pages in a multi-page document.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Page-independent multi-field validation in document capture is disclosed. In various embodiments, a data-entry form that spans multiple pages is populated using values extracted from different pages comprising a multi-page document. As a human operator indicates a readiness to resolve a next error or other validation task involving multi-field dependencies, an interface is provided that displays the field(s) to be validated, for each a corresponding part of the page image from which it was extracted, and a representation of the applicable validation rule that failed in automated validation. A validation rule can then be written that is independent from the value location. The operator trying to fix the problem can focus upon the business rule and the implicated fields and associated extracted values, without having to navigate manually through pages comprising the document and/or associated forms to find the other fields implicated by the validation rule and/or their associated extracted values and/or page image portions.

Figure 1:
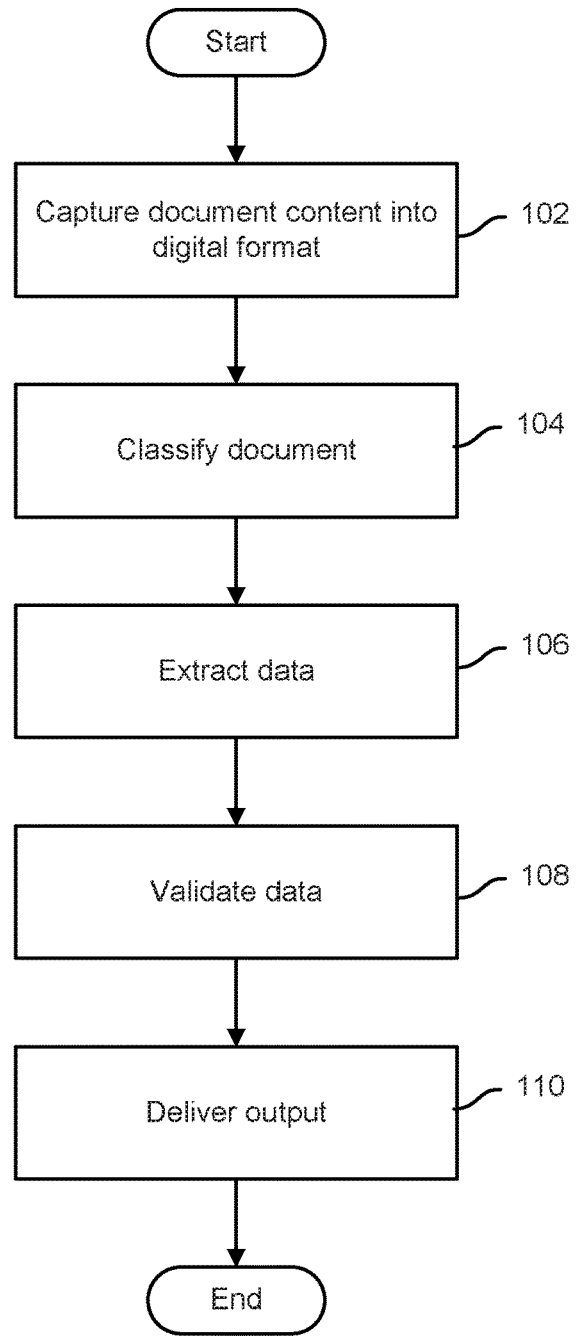
FIG. 1 is a flow chart illustrating an embodiment of a process to capture data.

FIG. 1 is a flow chart illustrating an embodiment of a process to capture data. In the example shown, document content is captured into a digital format (102), e.g., by scanning the physical sheet(s) to create a scanned image. The document is classified (104). In some embodiments, classification includes detecting a document type corresponding to an associated data entry form. Data is extracted from the digital content (106), for example through optical character recognition (OCR) and/or optical mark recognition (OMR) techniques. Extracted data is validated (108). In various embodiments, validation may be performed at least in part by an automated process, for example by comparing multiple occurrences of the same value, by performing computations or other manipulations based on extracted data, etc. In various embodiments, all or a subset of extracted values, e.g., those for which less than a required degree of confidence is achieved through automated extraction and/or validation, may be validated manually, by a human indexer or other operator. Once all data has been validated, output is delivered (110), e.g., by storing the document image and associated data in an enterprise content management system or other repository.

Figure 2:
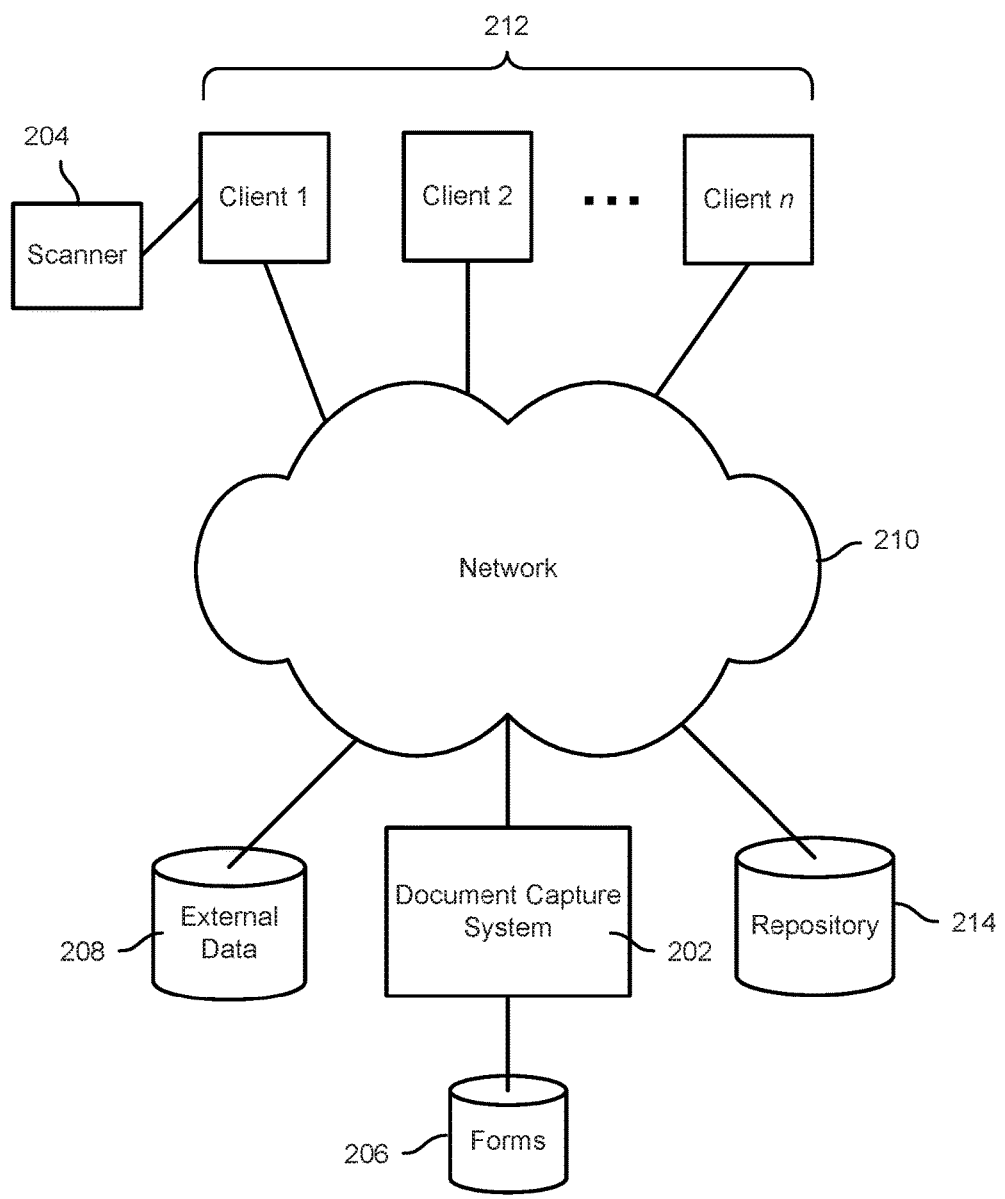
FIG. 2 is a block diagram illustrating an embodiment of a document capture system and environment.

FIG. 2 is a block diagram illustrating an embodiment of a document capture system and environment. In the example shown, a client system 212 is attached to a scanner 204. Documents are scanned by scanner 204 and the resulting document image is sent by the client system 212 to document capture system 202 for processing, e.g., using all or part of the process of FIG. 1. In the example shown, document capture system 202 uses a library of data entry forms 206 to create a structured representation of data extracted from a scanned document. For example, as in FIG. 1 steps 104 and 106, in some embodiments a document is classified by type and an instance of a corresponding data entry form is created and populated with data values extracted from the document image. In some embodiments, data validation may be performed, at least in part, by document capture system 202 by accessing external data 208 via a network 210. For example, an external third party database that associates street addresses with correct postal zip codes may be used to validate a zip code value extracted from a document. In the example shown, validation may be performed at least in part by a plurality of manual indexers each using an associated client system 212 to communicate via network 210 with document capture system 202. For example, document capture system 202 may be configured to queue human validation tasks and to serve tasks out to indexers using clients 212. Each client system 212 may use a browser based and/or installed client software provided functionality to validate data as described herein. In some embodiments, once validation has been completed the resulting raw document image and/or form data are delivered as output, for example by storing the document image and associated form data in a repository 214, such as an enterprise content management (ECM) or other repository.

Figure 3:
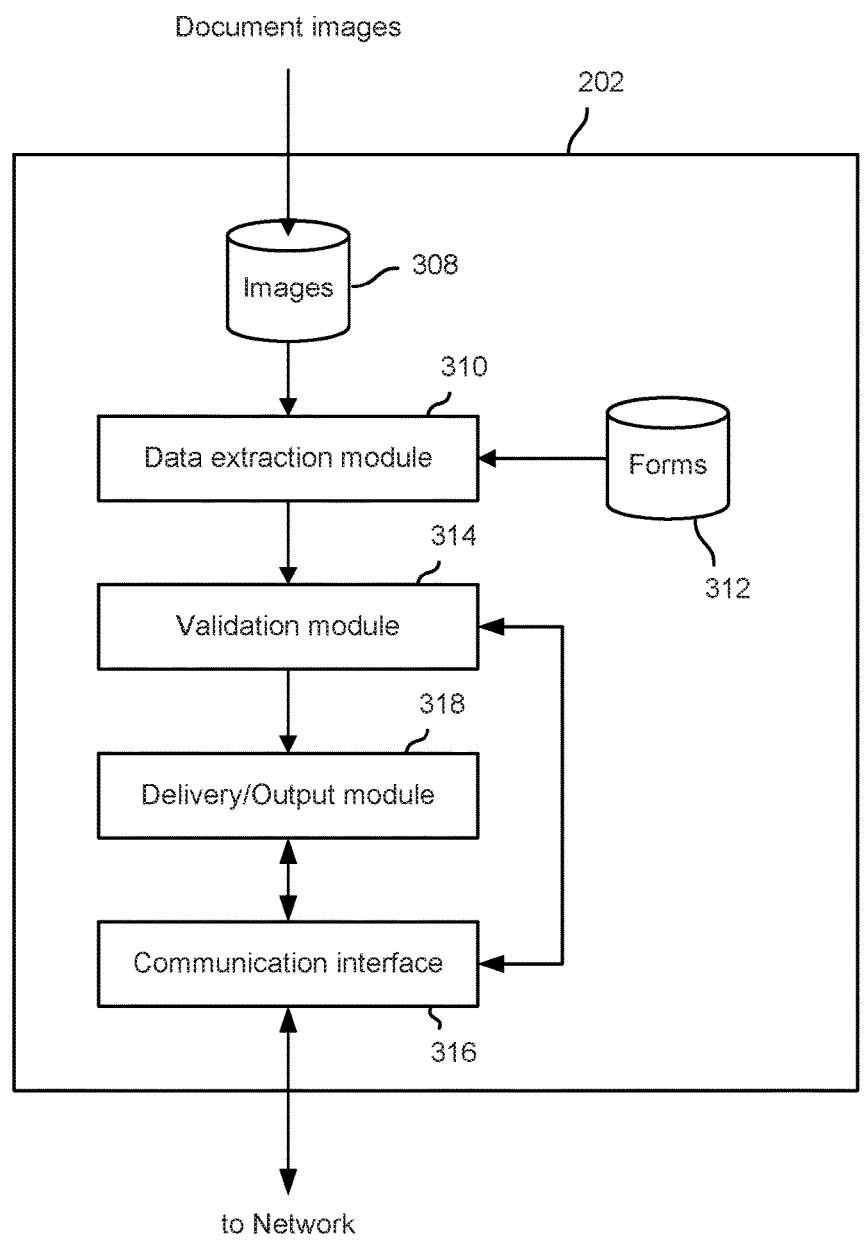
FIG. 3 is a block diagram illustrating an embodiment of a document capture system.

FIG. 3 is a block diagram illustrating an embodiment of a document capture system. In the example shown, the document capture system 202 of FIG. 2 is shown to receive document image data, e.g., via network 204 from a scanning client system 212. Document image data is received in some embodiments in batches and is stored in an image store 308. Document image data is provided to a data extraction module 310 which uses a data entry forms library 312 to classify each document by type and create an instance of a type-specific data entry form. Data extraction module 310 uses OCR, OMR, and/or other techniques to extract data values from the document image and uses the extracted values to populate the corresponding data entry form instance. In some embodiments, data extraction module 310 may provide a score or other indication of a degree of confidence with which an extracted value has been determined based on a corresponding portion of the document image. In some embodiments, for each data entry form field a corresponding location within the document image from which the data value entered by the extraction module in that form field was extracted, for example the portion that shows the text to which OCR or other techniques were applied to determine the text present in the image, is recorded. In the example shown, the data extraction module 310 provides the populated form to a validation module 314 configured to perform validation (automated and/or human as configured and/or required). In some embodiments, the validation module 314 applies one or more validation rules to identify fields that may require a human operator to validate. In the example shown, the validation module 314 may communicate via a communications interface 316, for example a network interface card or other communications interface, to obtain external data to be used in validation and/or to generate and provide to human indexers via associated client systems, such as one or more of clients 212 of FIG. 2, tasks to perform human/manual validation of all or a subset of form fields. The validated data is provided to a delivery/output module 318 configured to provide output via communication interface 316, for example by storing the document image and/or extracted data (structured data as capture using the corresponding data entry form) in an enterprise content management system or other repository.

Figure 4:
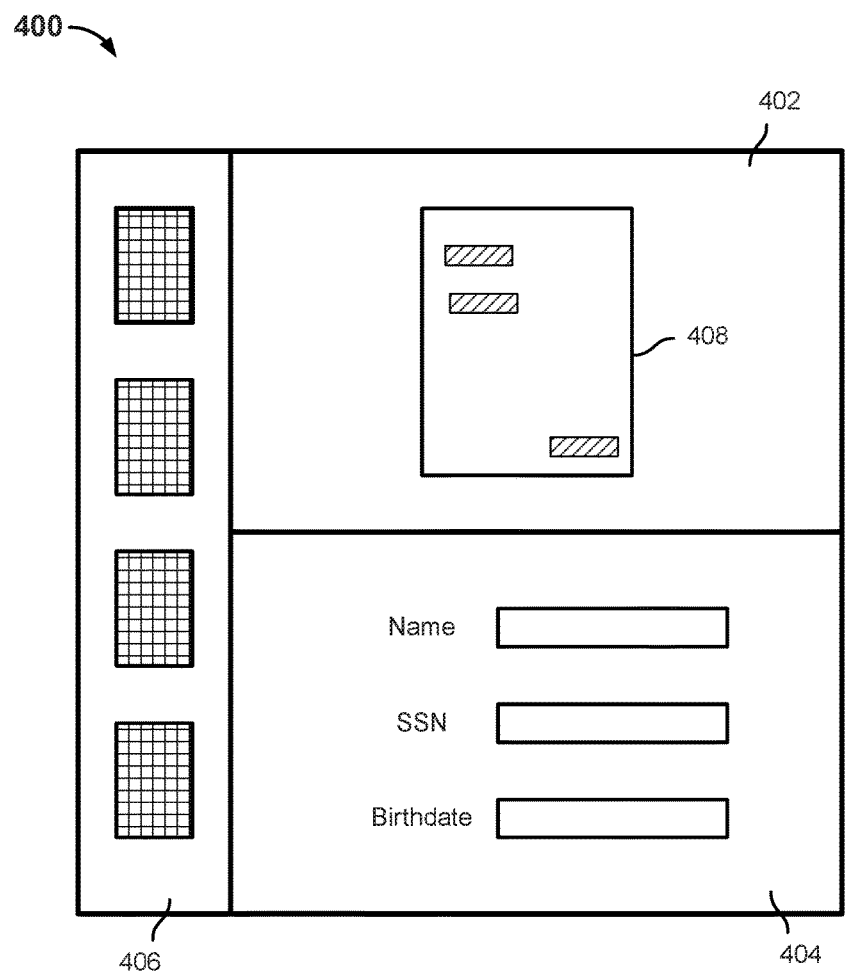
FIG. 4 is a block diagram illustrating an embodiment of a data validation user interface.

FIG. 4 is a block diagram illustrating an embodiment of a data validation user interface. In the example shown, validation interface 400 includes a document image display area 402, a data entry form interface 404, and a navigation frame 406. A document image 408 is displayed in document image display area 402. In the example shown, portions of document image 408 that correspond to data entry form fields in the form shown in data entry form interface 404 are highlighted, as indicated in FIG. 4 by the cross-hatched rectangles in document image 408 as shown. In this example, thumbnails are shown in navigation pane 406, each corresponding for example to an associated document and/or page from which data has been captured. In this example, the topmost thumbnail image as shown in navigation frame 406 of FIG. 4 is highlighted (thicker outer outline), indicating that document image 408 as displayed in document image display area 402 corresponds to the topmost thumbnail. In some embodiments, controls are provided (e.g., on screen controls, key stokes or combinations, etc.) to enable the operator to pan, scroll, and/or zoom in/out with respect to the document image 408, for example to focus and zoom in on (magnify) a particular portion of the document image 408. In some embodiments, as the operator validates each field a cursor advances to the next field and a corresponding portion of the document image 408 is highlighted.

Figure 5:
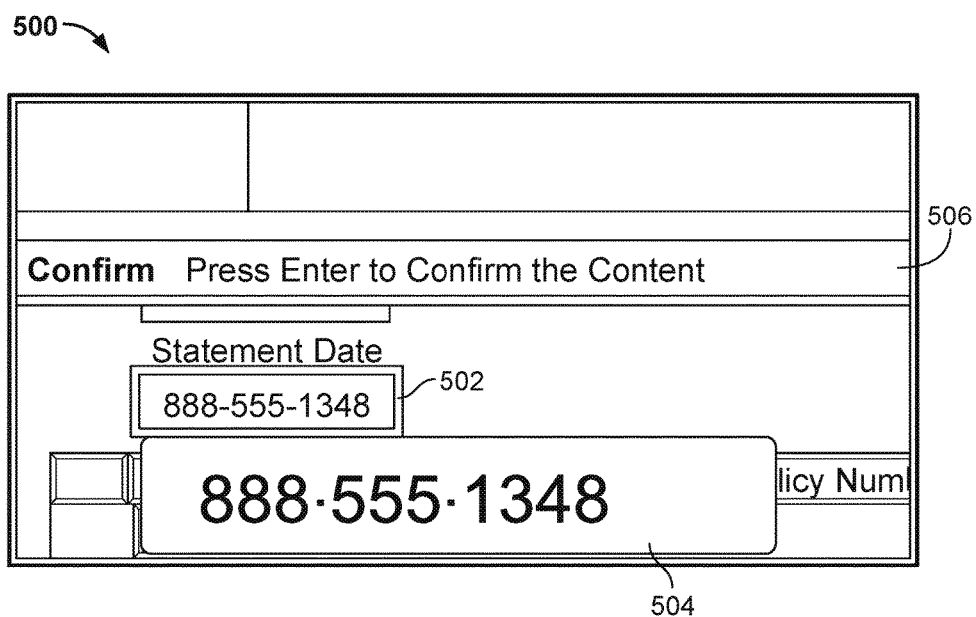
FIG. 5 is a screen shot illustrating an embodiment of a technique to minimize eye strain and/or fatigue in manual indexing.

FIG. 5 is a screen shot illustrating an embodiment of a technique to minimize eye strain and/or fatigue in manual indexing. In the example shown, partial screen shot 500 includes a portion of a manual data validation user interface that includes a data entry form field 502, in this example with a current value of "888-555-1348" displayed, and nearby to the form field, as displayed in the data entry form portion of the data validation interface, a snippet 504 taken from a corresponding document image, which shows just the portion of the document image that contains the image of the text (in this case numerical values) extracted from the document to populate the form field 502. In this example, a confirmation or other informational and/or error message 506 similarly is displayed near the form field 502. As a result, the form field 502, corresponding snippet 504, and confirmation message 506 are all in the line of sight, or nearly so, at the same time, enabling all information required to validate the value entered in the form field 502, including entering any correction that may be required, to be viewed at the same time and/or with minimal eye or head movement and without requiring the operator to scan back and forth between the document image frame and the data entry form, and/or to scroll, pan, or zoom in/out in the document image as viewed to locate and scale to a readable size the text to be validated. In some embodiments, the snippet 504 is scaled to ensure readability, for example by including in the snippet only (or mostly) the text to be validated and scaling the image to a readable size, for example until the image is of at least a prescribed minimum size and/or the displayed characters are of a prescribed minimum "point" or other size.

In some embodiments, as an operator finishes validation of a field, indicated for example by pressing the "enter" key or selecting another key or on screen control, the system automatically pans to the next data entry form field, retrieves and displays near the form field a corresponding document image snippet. In this way, the operator can navigate through the form and corresponding portions of the document image without retargeting, i.e., without having to redirect their eyes to a different point or points on the screen.

Figure 6:
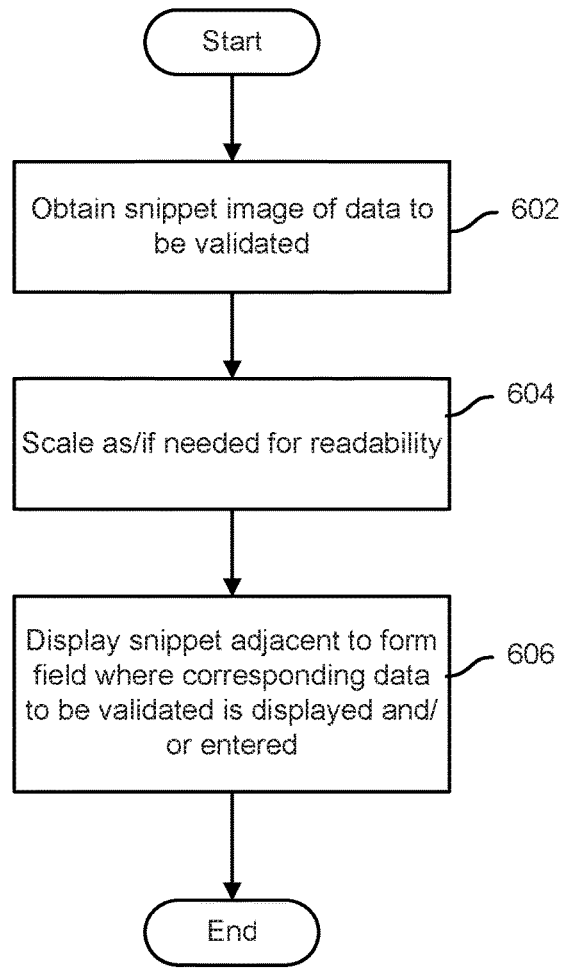
FIG. 6 is a flow chart illustrating an embodiment of a process to facilitate manual indexing.

FIG. 6 is a flow chart illustrating an embodiment of a process to facilitate manual indexing. In various embodiments, the process of FIG. 6 is used to provide an interface such as the one shown and described above in connection with FIG. 5. In the example shown in FIG. 6, a snippet containing the text or other document image portion corresponding to a data entry form field to be validated is obtained, and an association between the snippet and/or the associated location in the document image, on the one hand, and the corresponding form field, on the other hand, is stored (602). The snippet is scaled as/if need for readability (604). The scaled (if applicable) snippet is displayed adjacent or otherwise near to the form field where corresponding extracted data to be validated is displayed and/or entered (606).

Typically, as noted above pages comprising a multiple page document have been processed separately, each page having its own corresponding electronic data entry form associated with it. The per-page form approach has a number of shortcomings. For example, a value (e.g., an account number on the footer of each page in an invoice) may occur in several pages. An error on a single page results in work for the operator, because typically there is no framework to reconcile data across pages and to auto-correct data. In addition, in production, the operator will only become aware of the problem when he navigates to the page. If there are large discrepancies between values of many pages, then the operator must manually look at each page and that takes time.

In semi-structured and unstructured documents, there can be any number of variations of pages. If the data-entry form is page-based, and a unique form per page is used, this results in an unmanageable number of forms. If a generic form that contains a union of possible fields is used, this results in forms with unused fields. This requires extra work to handle. Furthermore, if a value is copied from another page, its source value and location typically is not shown because only the current page, and not the page from which the copied value was extracted, is shown. If the page is changed, it would result in the data-entry form being changed. Changing the data-entry form then disrupts the sequence of work, resulting in lower operator efficiency.

Under the form-per-page approach, when a table spans multiple pages, the technique of copying data between pages results in a large set of duplicate values. Extra effort is then needed to synchronize if the user makes any changes on any page. The navigation problem described above is compounded. For example, suppose the sub-totals on a multi-page invoice line items table do not add up. It is more cumbersome for the operator to go through each page and then each table, and to work with duplicate row values.

In content management systems, the metadata object is usually not defined per page. To export per-page forms, effort must be made to map values to their corresponding attributes of a metadata object used to represent the multi-page document in the content management system.

In light of all the foregoing shortcomings of the per-page approach to document capture as applied to multi-page documents, automatic detection and processing of a multi-page document as a single document is disclosed. In various embodiments, automatic detection of the pages comprising a multiple page document is performed. Data values are extracted from the pages comprising the document and used to populate a single electronic data entry form for the multi-page document. The operator can then go through the electronic data entry form, for example to validate data fields as required, and the document capture and/or validation system shows the location in the captured document of the corresponding data, regardless of which page(s) it occurs in, rather than the operator having to find and/or choose each page, indexing each independently, and then reconcile later data that occurs in and/or spans multiple pages.

Figure 7:
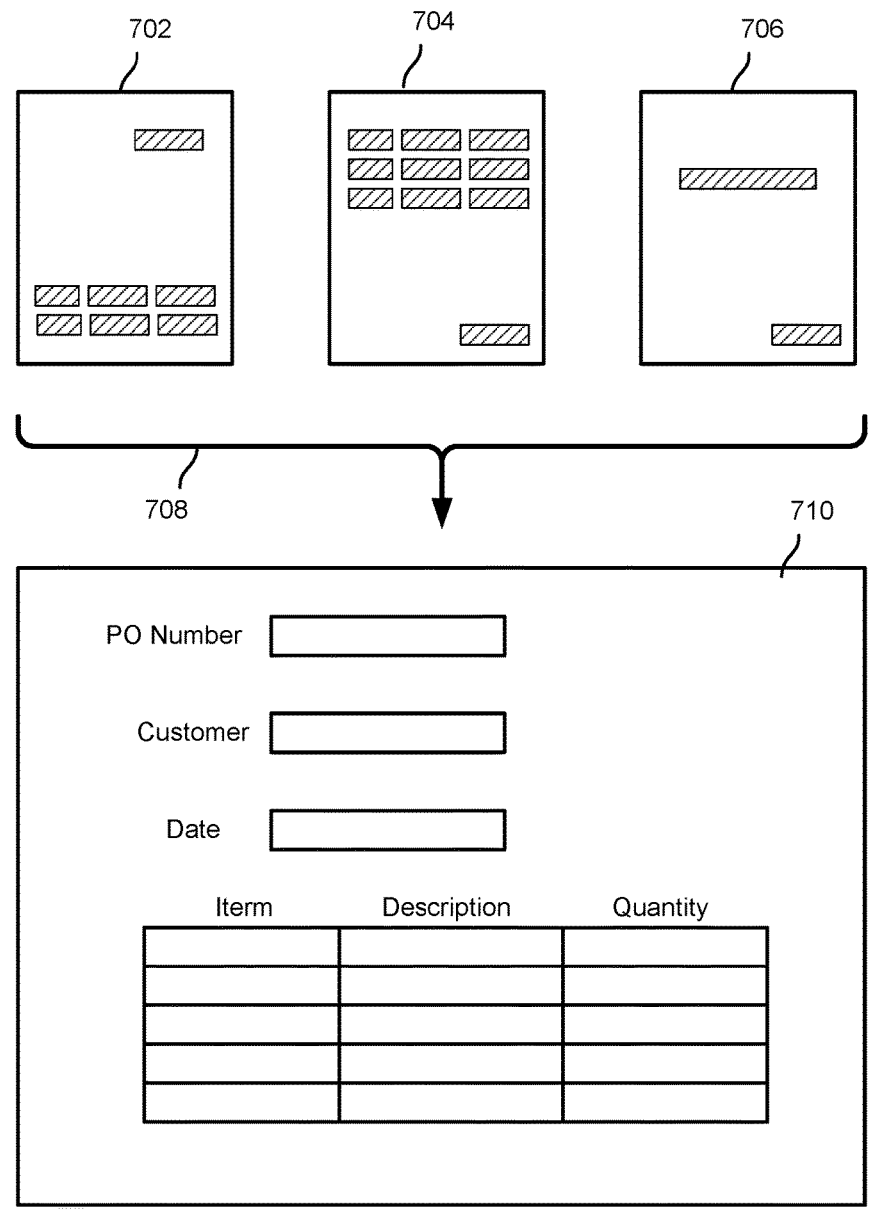
FIG. 7 is a block diagram illustrating an embodiment of a document capture system and process.

FIG. 7 is a block diagram illustrating an embodiment of a document capture system and process. In the example shown, scanned pages 702, 704, and 706 comprise a multi-page document. First page recognition and/or other techniques are applied in various embodiments to detect automatically the beginning and/or ending of a multi-page document such as document. The pages 702, 704, and 706 are identified through a process 708 as comprising a single multi-page document. A corresponding document type is determined and data values are extracted from pages 702, 704, and 706 to populate a single data entry form 710 configured to capture data values extracted from the multi-page document. In the example shown, the respective locations within the page images 702, 704, and 706 of data extracted to populate form 710 are shown as small cross-hatched rectangles. The rows at the bottom of page 702 and the top of page 704 in this example comprise a single table, list, or other array that spans pages 702 and 704. The corresponding extracted data values are in some embodiments captured initially in page specific arrays, the rows of which are concatenated in the example shown to populate the single table at the bottom of form 710.

Figure 8:
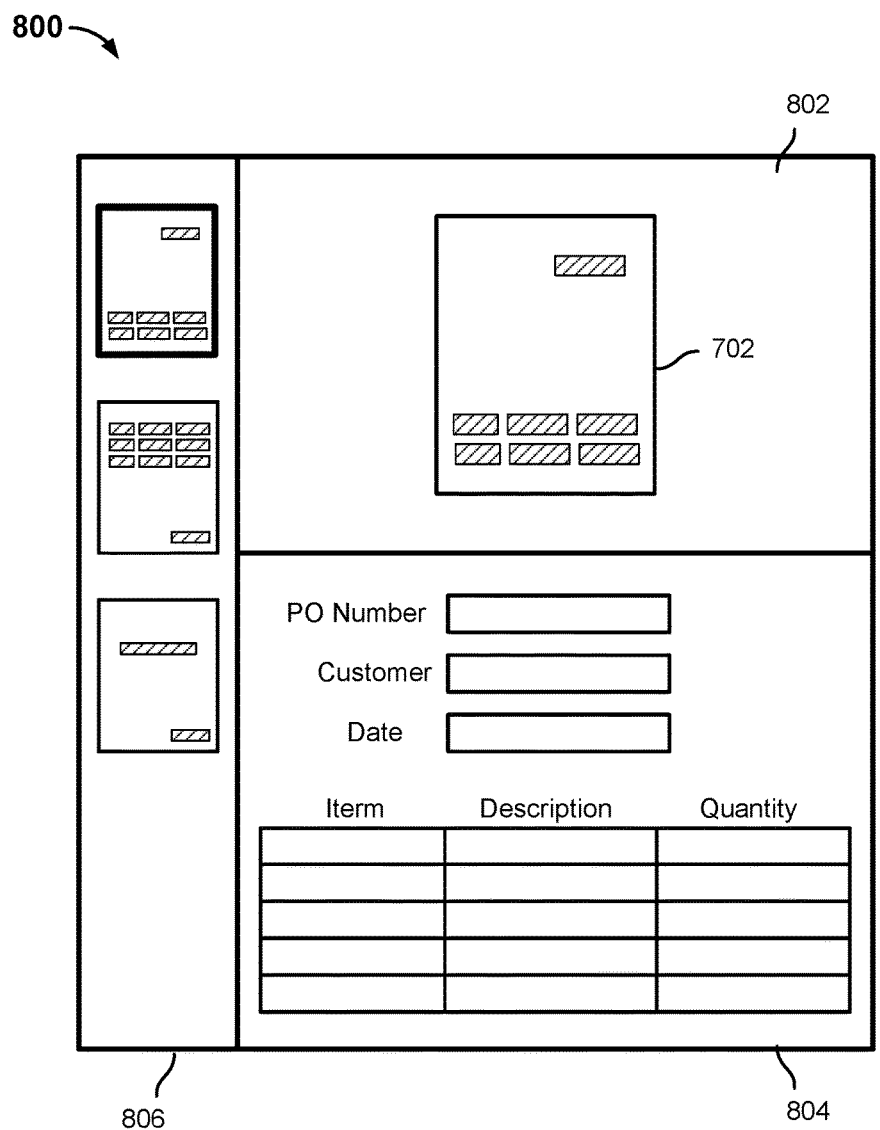
FIG. 8 is a block diagram illustrating an embodiment of an interface to validate a multi-page document.

FIG. 8 is a block diagram illustrating an embodiment of an interface to validate a multi-page document. In the example shown, the interface 800 includes a page image display area 802, in which in the example shown an image of page 702 of FIG. 7 is shown. The interface 800 further includes a data entry form area 804, in this example corresponding to the form 710 of FIG. 7. Thumbnails for the pages 702, 704, and 706 of FIG. 7 (not numbered individually in FIG. 8) are displayed in navigation pane 806. In the example shown, the topmost thumbnail as displayed in navigation pane 806 is highlighted as being currently "selected" for display in page image display area 802. In various embodiments, selection by a human operator of a thumbnail in navigation pane 806 results in an image of the corresponding page being displayed in page image display area 802. In some embodiments, as an operator navigates to different form fields in the form area 804 a corresponding portion or portions of the multi-page document, in one or more pages may be navigated to automatically. For example, navigation to a first row of the three column table at the bottom of the form in this example may in some embodiments cause the first page 702 to be displayed. Selection of a cell in one of the bottom three rows, either manually or automatically as the system advances to a next field to be validated, in various embodiments may cause the second page of the multi-page document, from which the corresponding data was extracted in this example, to be displayed in the page image display area 802. In various embodiments, selection of a field in form area 804 results in a snippet of a corresponding portion of the page from which the data associated with that field was extracted is determined, retrieved, and displayed, for example in a location adjacent or nearly adjacent to the field, as described above.

Figure 9A:
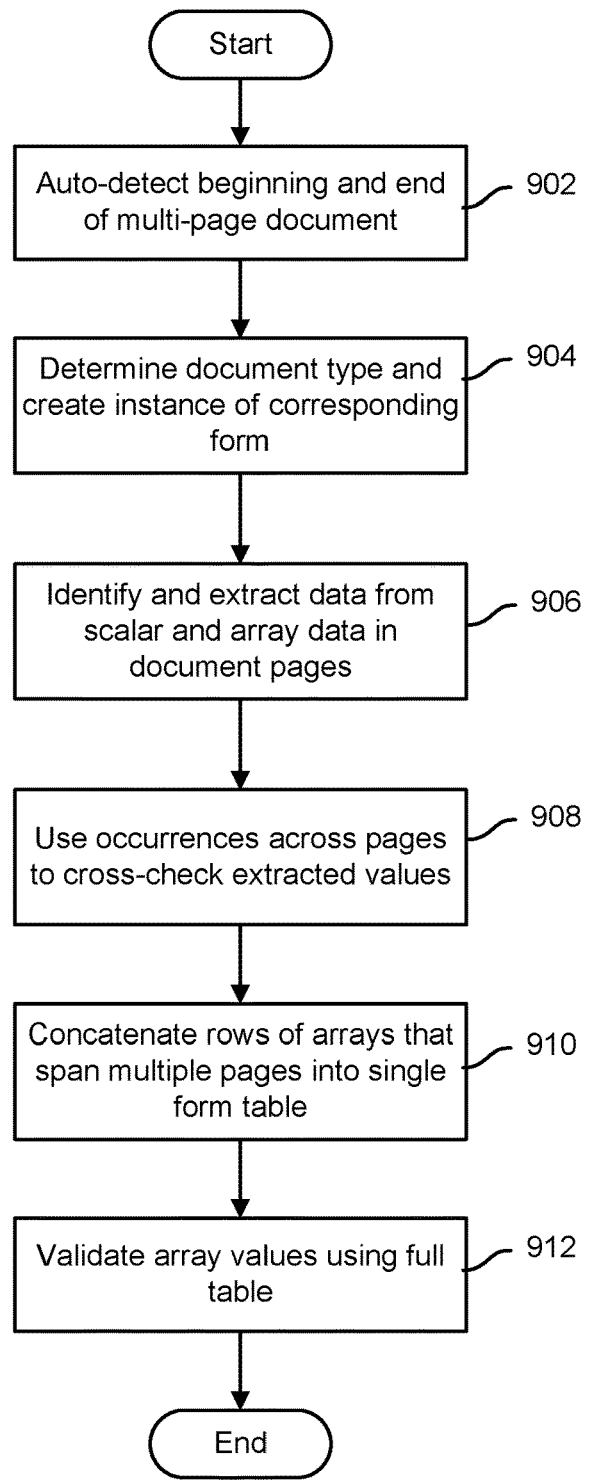
FIG. 9A is a flow chart illustrating an embodiment of a process to capture document data.

FIG. 9A is a flow chart illustrating an embodiment of a process to capture document data. In the example shown, the beginning and/or end of a multi-page document is/are detected (902). For example, known techniques to detect a first page may be used, and a multi-page document may be determined to have been encountered if one or more subsequent pages are scanned prior to a next "first" page is detected. A document type is determined and a corresponding data entry form instance is created (904). Scalar (single value) and array (tables, lists, or other two dimensional sets of data) data values are identified and extracted, for example using OCR, OMR, or other automated extraction techniques (906). Occurrences of the same and/or dependent values in multiple locations, including across page boundaries, may be used to perform automated and/or manual validation (908). For example, a name that appears at the beginning of a life insurance application and again in an attached report of a physical examination may be cross-checked to determine the accuracy of data extraction from one or both of the locations. Rows of arrays that span multiple pages are concatenated into a single form table (910). Array values may be validated using the full table, including across page boundaries (912). For example, quantity and unit price fields may be multiplied and the result compared to a line item subtotal, subtotals in all rows (including potentially across page boundaries) may be summed and compared to an extracted total, etc.

Figure 9B:
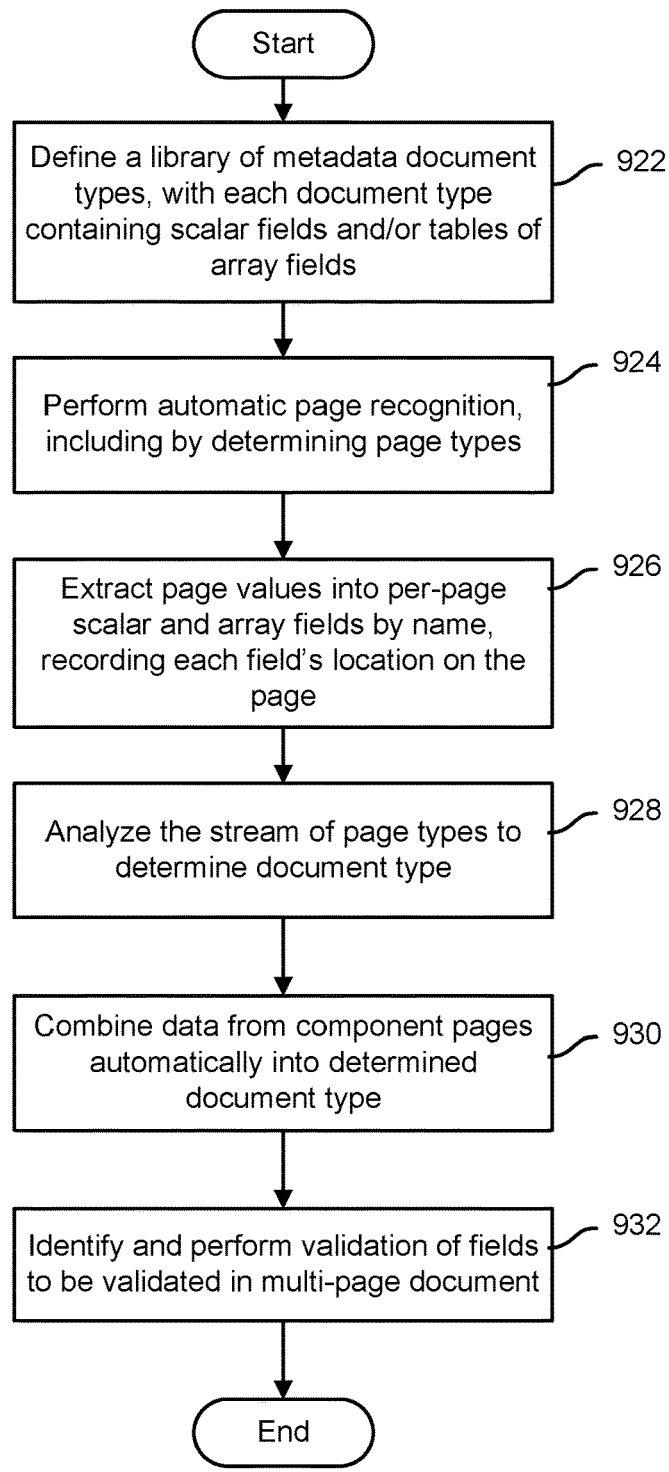
FIG. 9B is a flow chart illustrating an embodiment of a process to capture document data.

FIG. 9B is a flow chart illustrating an embodiment of a process to capture document data. In the example shown, a library of metadata document types is defined, with each document type containing scalar fields and tables of array fields (922). Automatic page recognition is done as in prior art, with page types determined (924). Values are extracted into per-page scalar and array fields by name, and each field's location on the page is saved (926). The multi-page document type is determined from an analysis of the stream of page types (928). Data from the component pages is automatically combined into the document type (930). A given named scalar field may occur on any page, or in multiple pages. Data validation is performed (932).

Figure 10:
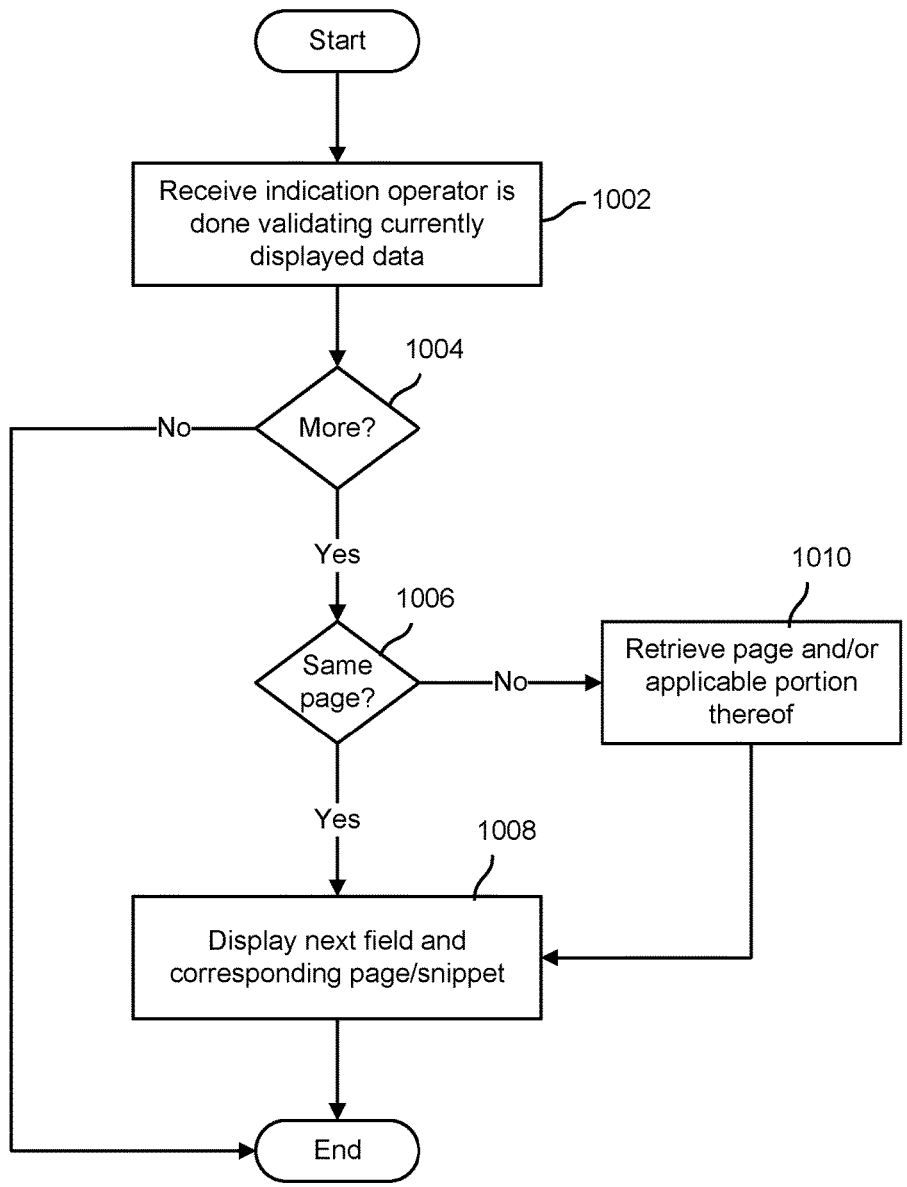
FIG. 10 is a flow chart illustrating an embodiment of a process to perform validation of data values extracted from a multi-page document.

FIG. 10 is a flow chart illustrating an embodiment of a process to perform validation of data values extracted from a multi-page document. In the example shown, an indication is received that an operator is done validating a currently displayed data (1002), e.g., the "Date" field in the example shown in FIG. 8. If no more fields remain to be validated (1004), the process ends. Otherwise, if the next field to be validated is on the same page (1006) the next field in the data entry form is advanced to and displayed, and a corresponding snippet or other portion of the current page, from which the associated data value to be validated was extracted, is displayed adjacent to the form field (1008). If the next form field requiring validation is associated with data from a different page of the multi-page document (1006), the system automatically retrieves or otherwise accesses the other page and/or an applicable portion thereof (e.g., a corresponding snippet) (1010), transparently to the human operator, and the next form field and the corresponding snippet obtained from the other page of the multi-page document are displayed for validation (1008) transparently to and without requiring any further action by the human operator.

Figure 11:
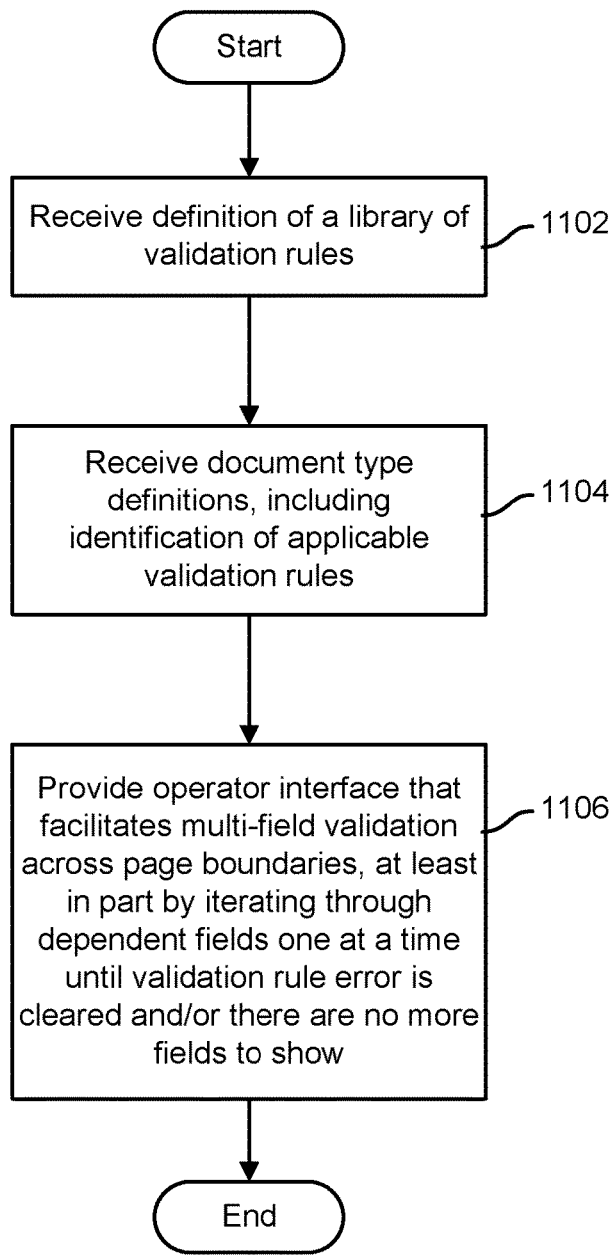
FIG. 11 is a flow chart illustrating an embodiment of a process to perform validation of data values extracted from a multi-page document.

FIG. 11 is a flow chart illustrating an embodiment of a process to perform validation of data values extracted from a multi-page document. In the example shown, a definition of a library of validation rules is received (1102). Examples include, without limitation, a rule requiring that a first value extracted from a named field A must match a second value extracted from a named field B. Another example is a rule requiring that a sum or other computation based on a specified set of fields must equal a value extracted from another named field, e.g., subtotals in an array must sum to equal a total. Document type definitions are received (1104). Each definition identifies validation rules to be applied, and as applicable a mapping to the document type fields to be used to apply each rule. An operator interface is provided that facilitates multi-field validation, including across page boundaries (1106). In some embodiments, for example, the interface enables an operator to iterate through just the dependent fields that require validation. As the operator corrects and/or confirms the entered value for a first dependent field, for example, and hits "enter", the system advances automatically to display a next one of the dependent fields and its associate document image portion, from whichever page in which it may be located. The system iterates through the dependent fields until the operator enters data that clears the validation error and/or there are no more dependent fields to be displayed. In various embodiments, by combining data extracted from multiple page images of a multi-page documents into a single document type and associated data entry form, automated and manual validation of dependent data fields that occur on or across different pages is facilitated, without requiring software code and/or human action to navigate between data entry forms used to capture data extracted from individual pages.

Figure 12:
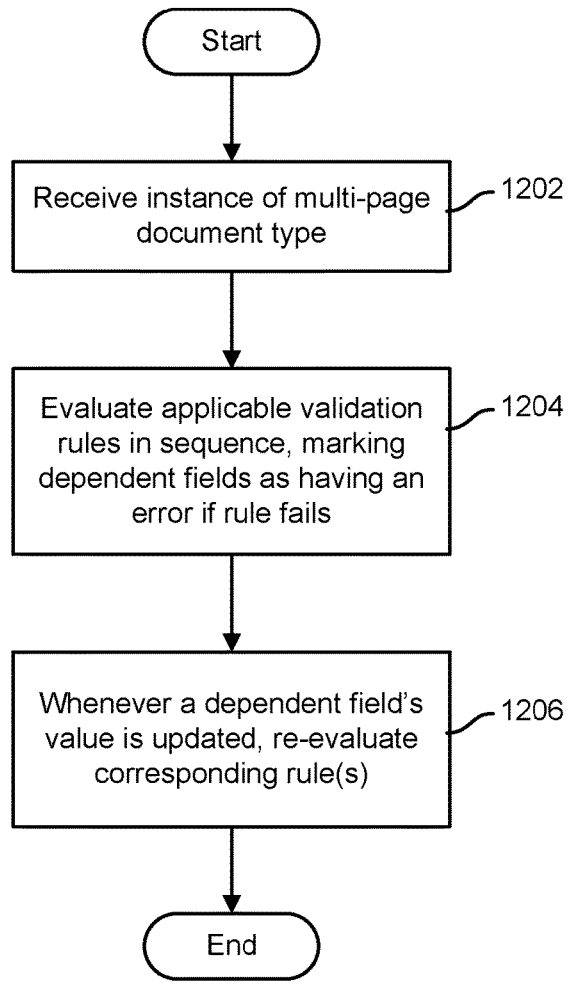
FIG. 12 is a flow chart illustrating an embodiment of a process to perform validation of data values extracted from a multi-page document.

FIG. 12 is a flow chart illustrating an embodiment of a process to perform validation of data values extracted from a multi-page document. In the example shown, an instance of a multi-page document type is received (1202). Applicable validation rules are evaluated, e.g., sequentially, including those requiring the concurrent processing of data values extracted from different pages, and any dependent fields are marked as having an error if a rule fails (1204). If during validation by a human operator (see, e.g., FIG. 10) a data value as extracted is corrected, e.g., the human operator enters a corrected value in a form field, validation rules affected by the change are re-evaluated, for example to ensure a correction that satisfied a first rule did not introduce an inconsistency that caused a second rule to not be satisfied. If the value for a field is visually confirmed with the page image to be correct, then the field can be flagged so it is henceforth no longer marked as having an error when a rule is re-evaluated (1204). In this way, operators can be more efficient by navigating only to unconfirmed fields.

In various embodiments, human operator validation of errors involving fields that have dependency relationships with other fields, such as a "name" value that occurs in more than one page of a multi-page document, is facilitated by displaying the fields together, in a single screen, along with each fields corresponding document image snippet, even if the snippets come from different pages. Likewise, as an operator iterates through error fields in a table or other two dimensional data structure, corresponding snippets are displayed, even if they come from multiple, different pages. The human operator need only navigate through fields in a single data entry form, and the system transparently retrieves and displays for each field its corresponding snippet or other partial image, without regard to page boundaries.

Former approaches to enable manual validation of data extracted from a multi-page document include field-level validation, a validation command, and rule-based validation techniques. In the field-level validation approach, each field is evaluated independently. The same rule must be evaluated multiple times, which may trigger multiple database query round-trips. If the dependent fields are not contiguous, then the operator cannot fix the error in context, and must spend extra effort to manually navigate back and forth between fields. This is especially costly if the dependent fields are on different pages. Also, if each field is evaluated independently, it is very complicated to determine the real reason for failure. In the validation command approach, a triggered command, such as an explicit button, is used to execute the validation logic and mark all the invalid fields. However, in this approach the operator must explicitly activate the command; navigational assistance typically is not provided to make the operator more efficient; and the operator may have made multiple changes between commands, so it is harder to determine which change caused a given error. Finally, in the rule-based approach, some applications may flag errors on multiple parts due to a rule (e.g. compilers and tax return software), but given current demands of high-speed document capture, the rule-based approach is insufficient because the operator must be able to fix the error very quickly. Rule-based validation may deal with error visualization, but not navigation and correction.

Using techniques disclosed herein, the navigation and visualization of multiple dependent errors can occur more quickly, resulting in increased operator task completion speed. In various embodiments, each rule is independently constructed so the same field may be a dependency for multiple rules. For example, in an invoice table, price X quantity=subtotal, and the sum of all sub-totals=grand total. If the summation of totals is correct, then the error must be in the price or quantity. The user does not have to construct complex logic to determine if a given field is valid and its appropriate validation message. Rules are automatically re-evaluated as the user updates a dependency field. This gives the user immediate notification and saves operator time in searching for additional errors.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   extracting data values from digital content that is generated by recognizing characters or marks from a multi-page document;
   generating a single data entry form comprising the data values extracted from the multi-page document, wherein the single data entry form includes a data value extracted from a first page of the multi-page document and one or more data values extracted from one or more other pages of the multi-page document;
   receiving an indication that one or more validation rules associated with one or more data entry form fields in the single data entry form comprising the data values extracted from the multi-page document has failed;
   providing a human validation interface that enables an operator to validate the one or more data entry form fields associated with the single data entry form in a first display area;
   receiving operator input that changes a data value associated with a first data entry form field of the one or more data entry form fields, wherein the data value associated with the first data entry form field is associated with at least one other data entry form field of the one or more data entry form fields; and
   in response to the operator input, re-evaluating the one or more validation rules, wherein the at least one other data entry form field is no longer marked as having an error when re-evaluating the one or more validation rules.

2. The method of claim 1, wherein the human validation interface enables the operator to cycle through the one or more data entry form fields sequentially.

3. The method of claim 1, wherein one or more thumbnails associated with one or more pages of the multi-page document are displayed in a second display area.

4. The method of claim 3, wherein the one or more pages of the multi-page document are displayed in a third display area.

5. The method of claim 4, wherein the human validation interface updates a depiction of the one or more thumbnails to be displayed in the second display area based at least in part on a current data entry form field.

6. The method of claim 4, wherein the human validation interface updates the one or more pages of the multi-page document displayed in the third display area based at least in part on a current data entry form field.

7. The method of claim 4, wherein the human validation interface updates the one or more pages of the multi-page document displayed in the third display area based at least in part on a selection of one of the one or more thumbnails.

8. The method of claim 1, wherein an image of the data values extracted from the digital content is displayed in an area associated with a corresponding data entry form field.

9. The method of claim 8, wherein the image is displayed when the corresponding data entry form field is to be validated.

10. The method of claim 8, wherein the image of the data values is scaled to a prescribed size.

11. The method of claim 1, wherein the one or more validation rules compare multiple occurrences of a same data value.

12. The method of claim 1, wherein the one or more validation rules compare the extracted data values with one or more values stored in a database.

13. The method of claim 1, wherein the data value associated with the first data entry form field and the data value associated with the at least one other data entry form field of the one or more data entry form fields are the same.

14. A document capture system, comprising:
   a display device; and
   a processor coupled to the display device and configured to:
      extract data values from digital content that is generated by recognizing characters or marks from a multi-page document;
      generate a single data entry form comprising the data values extracted from the multi-page document, wherein the single data entry form includes a data value extracted from a first page of the multi-page document and one or more data values extracted from one or more other pages of the multi-page document;

receive an indication that one or more validation rules associated with one or more data entry form fields in the single data entry form comprising the data values extracted from the multi-page document has failed;

provide a human validation interface that enables an operator to validate the one or more data entry form fields associated with the single data entry form in a first display area; and receive operator input that changes a data value associated with a first data entry form field of the one or more data entry form fields wherein the data value associated with the first data entry form field is associated with at least one other data entry form field of the one or more data entry form fields; and in response to the operator input, re-evaluating the one or more validation rules, wherein the at least one other data entry form field is no longer marked as having an error when re-evaluating the one or more validation rules.

15. The system of claim 14, wherein the human validation interface enables the operator to cycle through the one or more data entry form fields sequentially.

16. The system of claim 14, wherein one or more thumbnails associated with one or more pages of the multi-page document are displayed in a second display area.

17. The system of claim 16, wherein the one or more pages of the multi-page document are displayed in a third display area.

18. The system of claim 17, wherein the human validation interface updates a depiction of the one or more thumbnails to be displayed in the second display area based at least in part on a current data entry form field.

19. The system of claim 17, wherein the human validation interface updates the one or more pages of the multi-page document displayed in the third display area based at least in part on a current data entry form field.

20. The system of claim 17, wherein the human validation interface updates the one or more pages of the multi-page document displayed in the third display area based at least in part on a selection of one of the one or more thumbnails.

21. A computer program product to validate data, the computer program product being embodied in a tangible non-transitory computer readable storage medium and comprising computer instructions for:

extracting data values from digital content that is generated by recognizing characters or marks from a multi-page document;

generating a single data entry form comprising the data values extracted from the multi-page document, wherein the single data entry form includes a data value extracted from a first page of the multi-page document and one or more data values extracted from one or more other pages of the multi-page document;

receiving an indication that one or more validation rules associated with one or more data entry form fields in the single data entry form comprising the data values extracted from the multi-page document has failed;

providing a human validation interface that enables an operator to validate the one or more data entry form fields associated with the single data entry form in a first display area; and receiving operator input that changes a data value associated with a first data entry form field of the one or more data entry form fields, wherein the data value associated with the first data entry form field is associated with at least one other data entry form field of the one or more data entry form fields; and in response to the operator input, re-evaluating the one or more validation rules, wherein the at least one other data entry form field is no longer marked as having an error when re-evaluating the one or more validation rules.

* * * * *

UNITED STATES PATENT AND TRADEMARK OFFICE
CERTIFICATE OF CORRECTION

PATENT NO. : 10,120,537 B2
APPLICATION NO. : 15/055154
DATED : November 6, 2018
INVENTOR(S) : Ming Fung Ho It is certified that error appears in the above-identified patent and that said Letters Patent is hereby corrected as shown below:

In the Claims

In Column 11, Claim 14, Line 14, after "fields", insert --,--.

Signed and Sealed this
Sixteenth Day of April, 2019

Andrei Iancu
*Director of the United States Patent and Trademark Office*